United States Patent [19]

Raines

[11] Patent Number: 4,567,647
[45] Date of Patent: Feb. 4, 1986

[54] HANDLING DEVICE

[76] Inventor: Gordon L. Raines, P.O. Box 35398, Station D, Albuquerque, N. Mex. 87176

[21] Appl. No.: 591,960

[22] Filed: Mar. 21, 1984

[51] Int. Cl.$^4$ .............................................. B23P 19/00
[52] U.S. Cl. ........................................ 29/758; 29/268; 81/126
[58] Field of Search ................. 29/758, 750–752, 29/267, 268; 81/126, 128; 254/120, 131, 251, 253, 257; 294/62; 24/69 R, 68 TT, 68 CD, 68 CT; 410/96; 228/49 B, 44.1 R, 44.1 A

[56] References Cited

U.S. PATENT DOCUMENTS

| 1,364,128 | 1/1921 | Messinger | 294/62 |
| 2,020,823 | 11/1935 | Callahan | 294/62 |
| 3,029,670 | 4/1962 | Over et al. | 29/751 |
| 3,732,718 | 5/1973 | Barberio et al. | 29/751 |

FOREIGN PATENT DOCUMENTS 230708 3/1925 United Kingdom ................. 81/126

Primary Examiner—Howard N. Goldberg
Assistant Examiner—P. W. Echols
Attorney, Agent, or Firm—Donald P. Smith

[57] ABSTRACT

Apparatus for drawing together mating surfaces of rubber or plastic insulating material which have a high resistance to sliding motion. The invention embodies a handle rotatable through an arc of about 180 degrees wherein the initial 150 degrees of rotation draws members which clamp the materials together, and the final 30 degrees of rotation urges the clamping members away from each other to permit the materials to elastically align themselves.

6 Claims, 3 Drawing Figures

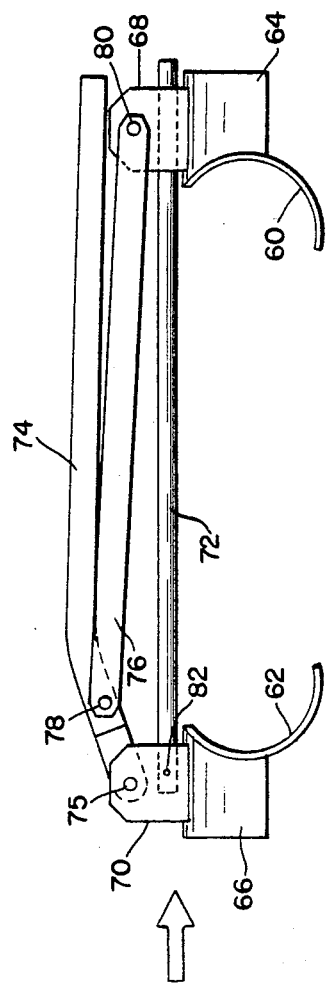
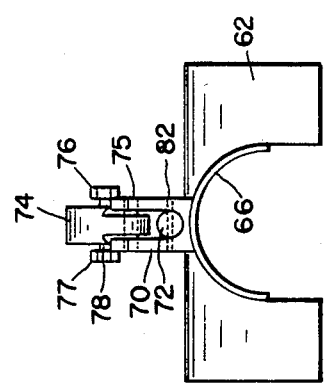

HANDLING DEVICE

BACKGROUND OF THE THE INVENTION (1) Field of the Invention

The invention relates to an apparatus and structure for drawing together insulators of the type used in high voltage underground power distribution systems.

(2) Description of the Prior Art

The electrical distribution systems of many modern utility companies rely on underground service to distribute electrical energy. Many problems arise from this method of distribution, not the least of which include dampness in the underground pockets or cavities, and cramped working quarters in such cavities which may have been constructed years ago when the demand for electricity was only a fraction of what it is today. When an underground power cable is to be added or replaced in the system the cavity must first be prepared for the workmen's entry by removing any accumulation of water and by pumping in fresh air. Men can then enter the confined space to do the work.

Advances in chemical engineering have substantially pushed forward the art of insulation for high voltage applications. Modern plastic dielectrics are durable and efficient and enhance the safety of those men who must work on power distribution lines when the line is not disconnected from the voltage source. However, the very durability, toughness, and flexibility of the insulation creates practical problems of physical handling when work must be done in confined spaces and when a number of men must enter the space to perform the necessary operations. The structure to be hereinafter described as a preferred embodiment allows one man, in lieu of several, to draw together a plurality of mating dielectric surfaces which have a high resistance to sliding motion.

Applicant is aware of the following prior art patents:

| Murray | 650,983 |
| Shaffrank | 828,576 |
| Altman | 1,073,063 |
| Woodhouse | 1,758,210 |
| Davis | 2,442,266 |

The patent to Shaffrank discloses a structure to enable a workman to carry a series of bricks, or the like, which can be arranged in-line, and comprises a support bar with a depending member to engage one end of the bricks and a hinged handle having a depending member to engage the other end of the bricks.

Each of the remaining patents, identified above, is directed to the problem of applying force to a flexible member, such as a chain, fence, or strap, to stress it and lock it against motion.

None of the prior art cited above teaches or even appears to suggest the invention to be hereinafter described.

SUMMARY OF THE INVENTION

The invention relates to a method and apparatus for drawing together mating surfaces of insulating material which have a high resistance to sliding motion. It is accordingly an object of the invention to provide a clamping tool for drawing together a pair of insulators having mating surfaces of revolution.

It is another object of the invention to provide a clamping tool for forcing together mating surfaces of revolution and then releasing the force to permit the surfaces to elastically align themselves.

It is yet another object of the invention to provide a clamping tool having a handle rotatable through an arc of about 180 degrees, and wherein the initial 150 degrees of rotation draws clamping members together and the final 30 degrees of rotation urges the clamping members away from each other.

BRIEF DESCRIPTION OF THE DRAWINGS

A detailed description of the invention will be made with reference to the accompanying drawings wherein like reference characters designate like or corresponding parts in the several figures:

FIG. 2 is an elevation view showing the clamping tool which is the subject of this invention.

FIG. 3 is an end view of the clamping tool looking in the direction of the arrow in FIG. 2.

DESCRIPTION OF THE PREFERRED EMBODIMENT

Figure 1:
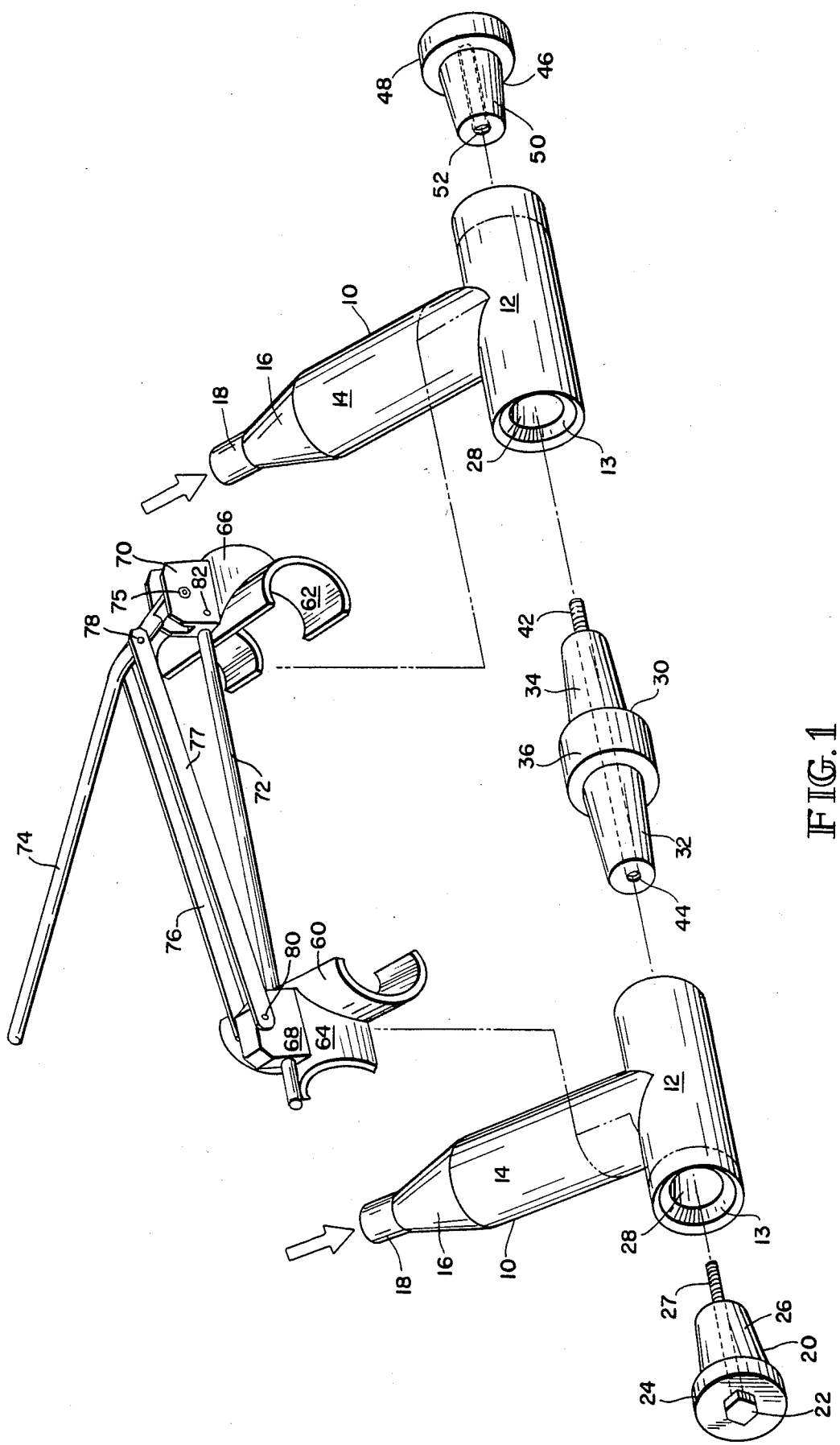
FIG. 1 shows a perspective view of the clamping tool of the invention together with an exploded view of the insulators upon which it is intended to operate.

The following detailed description is of the best method, and structure, and mode of carrying out the invention. The description is not to be taken in a limiting sense, but is made for the purpose of illustrating the general principles of the invention. The scope of the invention is defined by the appended claims. Reference is here made to U.S. Patent Office Disclosure Document Ser. No. 119,476, received in the Patent Office on July 2, 1983 and which reveals evidence of the conception and actual reduction to practice of the invention disclosed and claimed herein.

Referring now to the drawings, reference character 10 designates two generally T-shaped members made of plastic, rubber or any of a large group of organic synthetic or processed materials having good dielectric properties, that are molded or cast and used to protect and insulate cables carrying high voltage. The cables (not shown) to be used with these members are inserted at the end of members 10 and in the direction indicated by the arrows. Each such cable has a terminal at the end which is inserted into the member and a hole is formed at the end of the terminal for the purpose of electrically joining the cables.

Members 10 consist of cylindrical elements 12 having cup-shaped relieved areas 13 at each end and frustro-conical surfaces 28 formed therein. Elements 14 are disposed at a right angle to members 12 and have a frustro-conical middle portion 16 terminating in a hollow ring 18.

Median structure 30 comprises an annulus 36 having frustro-conical surfaces of revolution 32 and 34 extending therefrom. A metallic threaded aperture 44 is formed in one surface of revolution and a threaded shaft 42 extends from the other substantially as shown. Shaft 42 reaches through structure 30 and is joined to metallic aperture 44.

End piece 20 has an annulus 24 and a frustro-conical surface of revolution 26 formed integral therewith. A threaded bolt 27 having a hexagonal head 22 reaches through such end piece.

End piece 46 has an annulus 48 and a frustro-conical surface of revolution 50 having a threaded aperture 52 formed therein.

The several parts of the assembly heretofore described and shown in the exploded view of FIG. 1 are forced together after inserting the cables into elements 14, whereby the hole in the cable terminal extends into members 12. Members 12 are fitted over their respective mating surfaces of revolution 32 and 34 of median structure 30, and bolt 42 penetrates the hole in one cable terminal. End piece 46 is fitted into member 12 and turned so that threaded aperture 52 receives bolt 42 and annulus 48 telescopes into the end of the member. End piece 20 is fitted into member 12 with surface of revolution 26 engaging surface 28 inside the member, which causes bolt 27 to penetrate the hole in its respective cable terminal. Turning the bolt head 22 causes it to thread into aperture 44 drawing annulus 24 into the cup shaped relieved area 13. A firm fixed water tight cable connecting assembly is thus created once the several bolts have engaged their respective apertures which assembly has great mechanical strength and very high insulating properties.

The problem recognized and solved by applicant is that in view of the very tight fit of the parts in practice and the very high resistance to sliding motion offered by the several mating surfaces it takes four to six strong workmen to manually force the pieces together sufficiently to gain one or two threads of the bolts in their respective threaded apertures. Additionally, as before stated, the very confined and cramped working quarters in underground pockets often prevent more than one or two men to enter. The tool structure to be now described solves the above described problem by enabling one man alone to force the insulators together. It has the additional and unexpected advantage of recognizing that the high resistance to sliding motion offered by the several mating surfaces causes some distortion of the members when being forced together by the forcing action of the tool. As will later be more fully explained, the initial motion of the tool moves clamping members to a stable fixed and locked mode wherein the several insulator parts are fitted, one into another, and the final motion of the tool moves clamping members away to a stress relieved mode to permit the insulator parts to elastically align themselves.

Referring now to FIGS. 1, 2 and 3, taken together, reference characters 60 and 62 designate arcuate forcing members each having a respective arcuate structure 64 and 66 formed thereon, the respective axes of symmetry of the respective members and structures forming a right angle, substantially as shown. On each structure 64 and 66 is formed a boss 68 and 70. Boss 70 comprises two upwardly and spaced ears to receive an elongated bent rod 74 having the minor portion thereof forming an obtuse angle of about 170 degrees with the major portion. A pair of elongated rods 76 and 77 straddle boss 68, are pivoted thereto by pin 80 and extend to and straddle rod 74 where they are pivotally attached by pin 78. A second elongated rod 72 is attached to boss 70 by pin 82 and reaches to and slidably pierces boss 68.

In operation the cables to be connected together are inserted into elements 14 with the hole in the cable terminal extending into members 12. Median structure 30 has its two surfaces of revolution 32 and 34 inserted into respective ends of the members 12 with bolt 42 penetrating the hole in the right hand cable terminal. End pieces 46 and 20 are fitted into the their respective ends of members 12 with bolt 27 penetrating the hole in the left hand cable terminal. It will be understood that the fitting together, so far described, is incomplete because the insulation has a high resistance to sliding motion and it is very difficult to manually compress the parts together. The tool is now used. Rotation of rod 74 in a counterclockwise direction urges members 60 and 62 apart. The tool is then applied to the partially assembled insulators with arcuate structures 64 and 66 straddling the outward ends of members 12 and, in the case illustrated, the left hand sections of arcuate facing members 60 and 62 embracing the outward sections of their respective elements 14. Rotation of rod 74 in a clockwise direction draws members 60 and 62 together on guide rod 72 with great mechanical advantage. Rotation of rod 74 about 150 degrees brings the ends of bars 76 and 77 over boss 70. In this position rod 72, bars 76 and 77, and the minor portion of rod 74 are all parallel, one to another, and the assembly locks itself against reverse motion. At this point, the operator can release rod 74 and rotate end pieces 20 and 46 to engage the threads and fasten the assembly together. Further rotation of the handle beyond the over-the-center position (about 30 degrees) releases the forces somewhat and the members 60 and 62 retreat from each other. This small final motion of rod 74 allows the plastic insulators which may have distorted under stress to elastically align themselves.

From the above description it will be seen that the problem of insulator joining in limited space has been solved. One man can now do the work of several in relative comfort and with a substantial saving in labor costs.

It will be apparent to those skilled in the art that many changes may be made in the construction and arrangement of parts without departing from the scope of the invention as defined in the appended claims.

I claim:

1. A clamping tool for drawing together a pair of insulators having mating surfaces of revolution comprising in combination:
   (a) a pair of arcuate members disposed in mutually facing relationship,
   (b) An upwardly extending boss on each respective member,
   (c) a first elongated rod slidably connecting between the said bosses,
   (d) a second elongated rod pivotally connected at one end to a first boss, and
   (e) a pair of parallel bars extending between and pivotally connected to the said second elongated rod and the second boss and straddling the same whereby arcuate motion of said second rod results in motion of the said arcuate members toward and then away from each other.

2. The invention according to claim 1 including an arcuate structure formed on each respective arcuate member, the respective axes of symmetry of the said structures and the said members describing a right angle.

3. The invention according to claim 2 wherein the first boss comprises to upwardly extending and spatially arranged ears to receive the said second rod therebetween.

4. The invention according to claim 3 wherein the said second rod has a major portion thereof forming an obtuse angle with a minor portion.

5. The invention according to claim 4 wherein the said obtuse angle is about 170 degrees.

6. The invention according to claim 5 wherein the motion of said second arm comprises an arc of about 180 degrees and wherein the initial 150 degrees of motion draws the said arcuate members toward each other, and the final 30 degrees of motion urges the said arcuate members away from each other.

* * * * *